United States Patent [19]

Erb

[11] Patent Number: 4,799,798

[45] Date of Patent: Jan. 24, 1989

[54] METHOD OF AND AN APPARATUS FOR AN OPTICAL MEASURING OF A POSITION

[75] Inventor: Karl J. Erb, Gossau, Switzerland

[73] Assignee: Mettler Instruments AG, Greifensee, Switzerland

[21] Appl. No.: 11,314

[22] Filed: Feb. 5, 1987

[30] Foreign Application Priority Data

Feb. 18, 1986 [CH] Switzerland ............................ 641/86

[51] Int. Cl.<sup>4</sup> .............................................. G01B 11/00
[52] U.S. Cl. .................................. 356/374; 33/125 A; 33/125 C; 250/237 G
[58] Field of Search ....................... 356/373, 374, 375; 250/231 SE, 237 G; 33/125 A, 125 C; 340/347 P

[56] References Cited

FOREIGN PATENT DOCUMENTS

| 0111642 | 6/1984 | European Pat. Off. |
| 0118673 | 9/1984 | European Pat. Off. |
| 0121658 | 10/1984 | European Pat. Off. |
| 0145106 | 6/1985 | European Pat. Off. ......... 250/237 G |
| DE3150349 | of 0000 | Fed. Rep. of Germany |
| 0157116 | 9/1982 | Japan ................ 250/237 G |
| 0052706 | 3/1984 | Japan ................ 356/373 |
| 2099993 | 12/1982 | United Kingdom ................ 356/373 |

Primary Examiner—F. L. Evans
Attorney, Agent, or Firm—Watson Cole Grindle & Watson

[57] ABSTRACT

The method of measuring positions is based on tracking an interference pattern which is generated when line grids is different line densities are superimposed. According to the present method the line grid of an optical scale is projected onto a line grid formed by a plurality of adjacently arranged diodes, whereby digital switching elements are allocated to the photodiodes and are integrated with same on a common substrate and which compare pair-wise the intensities of adjacent diodes. An absolute measuring of positions proceeds by an additional coding of the line grid of the scale. The method has use in linear as well as curvilinear (angular) measuring of positions.

7 Claims, 4 Drawing Sheets

METHOD OF AND AN APPARATUS FOR AN OPTICAL MEASURING OF A POSITION

BACKGROUND OF THE INVENTION

1. Field of the invention.

The present invention relates to a method of an optical measuring of a position including the provision of a photosensitive element having a plurality of photodiodes equidistantly spaced apart from each other and forming a line grid, and of an optical scale which is displaceable relative to the photosensitive element and which scale is projected onto the photosensitive element, the projected line density of the scale being different from the line density of the photosensitive element and the phase relationship of the interference pattern generated thereby being detected in order to determine the mutual relative position of the two line grids.

2. Description of the prior art.

Various methods of an optical measuring of a position are known by means of which a high resolution can be arrived at. The lengths of measurement which can be arrived at by such methods are, however, limited. Due to this fact optical position measuring methods of the kind mentioned above have been applied mainly in angle measuring apparatuses, such as for instance in modern theodolites.

The German published patent application DE-OS No. 3150349 discloses for instance an angle detector of high resolution for use in a theodolite. It encompasses basically the principle of the high resolution by mans of line grids and an array of photodiodes, i.e. the principles of a detection of positions by means of optical interference of line grids having varying line densities, or a line grid and photodiode array, respectively.

The outputs of photodiode arrays of this known apparatus are subjected to an analogue processing, for instance by using CCD's which are generally available on the market.

In case an absolute value measurement is to be carried out besides the high resolution two separate diode arrays are proposed which are arranged such that the projected line grid in the second array is displaced in phase relative to the first array by 90° such as to thereby incrementally detect the absolute angular rotation.

A further possibility proposed for detecting the absolute value is a separate optical trace having a binary Gray-code.

The European patent application No. 83 109 286.1 describes also explicitly the possibility of a high resolution by means of a line grid and of a photodiode array for a measuring and detecting of a linear or curvilinear movement of a scale. However, the specification lacks an exact explanation as to how the large number of photodiode connections are to be lead to a signal processor and processed thereat. It is mentioned, furthermore, in very general terms that the principle may be realized not only on an optical, but also on an electrostatic (capacitive) or magnetic basis.

The disclosed method and apparatus are obviously suitable only for a detecting of very small or tiny, movements.

The European applications No. 84 100 465.8 and No. 84 100 697.6 describe also measuring apparatuses which are based on the already mentioned principle. In this case separate reference markings are located aside of the regular line grid trace for the incremental high resolution such as to enable a detecting of absolute values.

SUMMARY OF THE INVENTION

An object of the invention is to provide a method and an apparatus, which are in a position to follow and determine incrementally the shifting of the optical scale by a following of the phase relationship of the pattern of the interference, whereby the resolution across very large measured lengths (e.g. several meters) can amount to less than 1 $\mu$m (1/1000 meter). The method shall, thereby, be supported by a processing of signals which may be realized in a particularly simple and compact form.

To this end the method of optically measuring positions such as defined initially features according to the present invention the photosensitive element comprising an array of photodiodes having digital switching elements allocated to every photodiode for the processing of the signals, whereby the photodiodes and switching elements are integrated in the same substrate and compare pair-wise the intensities of adjacent diodes.

The method according to the invention allows not only a novel and particular advantageous processing of signals in connection with determining the high resolution by means of line grid and array of photodiodes, but lends itself additionally specifically for an absolute positional measuring. For this specific embodiment of the method according to the invention, i.e. the application of the method for an absolute measuring of position it is merely necessary to additionally code the line grid of the optical scale.

The coding of the line grid of the optical scale can be achieved for instance by a sectional interchanging of light and dark areas according to a predetermined pattern, e.g. in accordance with a linear maximal length frequency. This means that the hitherto regular light-/dark pattern has to be inverted at some places according to a linear pseudo-random sequence, i.e. light and dark areas must be interchanged.

It shall be mentioned here that the said pseudo-random sequence represents in fact a sequence of 0's and 1's of the length $2^n-1$ bits which appears to be random, but is, however, generated deterministically. A characteristic feature of such a binary sequence is the fact that based on the knowing of n subsequent bits the exact length of this partial sequence having a length of n bits can be determined inside of the complete sequence of $2^n-1$ bits.

Similarly, the coding of the line grid can proceed by means of a binary pulse width modulation, i.e. by an interchanging during a shorter interval for the binary value 0 and and interchanging during a longer interval for the binary value 1.

Due to this specific embodiment of the method according to the invention an accordingly absolute measuring of positions is possible without the need of additional code tracks or additional markings. The line grid which is necessary for the high resolution must merely be coded itself in a suitable form.

Subject of the invention is also an apparatus for practicing the method which comprises a light source, a photosensitive element in form of a plurality equidistantly spaced photodiodes forming a line grid, and an optical scale which is arranged movably relative to these photodiodes and having a line grid which is projectable onto the photodiodes by the light source, which apparatus comprises in accordance with the invention digital switching elements allocated to every photodiode of the array of photodiodes and integrated in the same substrate.

Preferably an optical means is provided for transmitting the line grid onto the photosensitive element.

The optical magnification factor k is in such case selected such that the spacing of the photodiodes differs from the spacing of the projected light/dark-areas by a predetermined value. In such case the intensities of the light collected by the individual diodes increase linearly and generate an interference pattern of a predetermined period.

According to a specifically preferred embodiment of the apparatus the light source and the photosensitive element are located in a transparent glass or plastic body which latter forms simultaneously the optics for the transmitting of the line grid which is arranged movably on the body of the scale onto the photosensitive element.

BRIEF DESCRIPTION OF THE DRAWINGS

The present invention will be more fully understood by reference to the following detailed description thereof when read in conjunction with the attached drawings, and wherein.

DETAILED DESCRIPTION OF THE PREFERRED EMBODIMENTS

Below, the inventive method for an optical measuring of a position, specifically the preferred measuring of an absolute value by means of this method and having a resolution of less than 1 $\mu$m (1/1000 meter) over very large measured lengths such as e.g. up to several meters will be described and explained in detail.

The method and obviously the apparatus for practicing same demands an extremely precise optical scale including an especially coded line grid (the scale can be transparent or reflecting), further a light source and a fully integrated photosensitive element in form of an array of photodiodes including a processing of signals, which may be produced by generally known NMOS or CMOS technologies.

In order to project the line grid of the scale onto the photodiode array a simple optical means is preferably used. The light source can be selected arbitrarily, i.e. it must not necessarily be coherent. In the present case a simple and low cost non-coherent light source is made use of.

Figure 1:
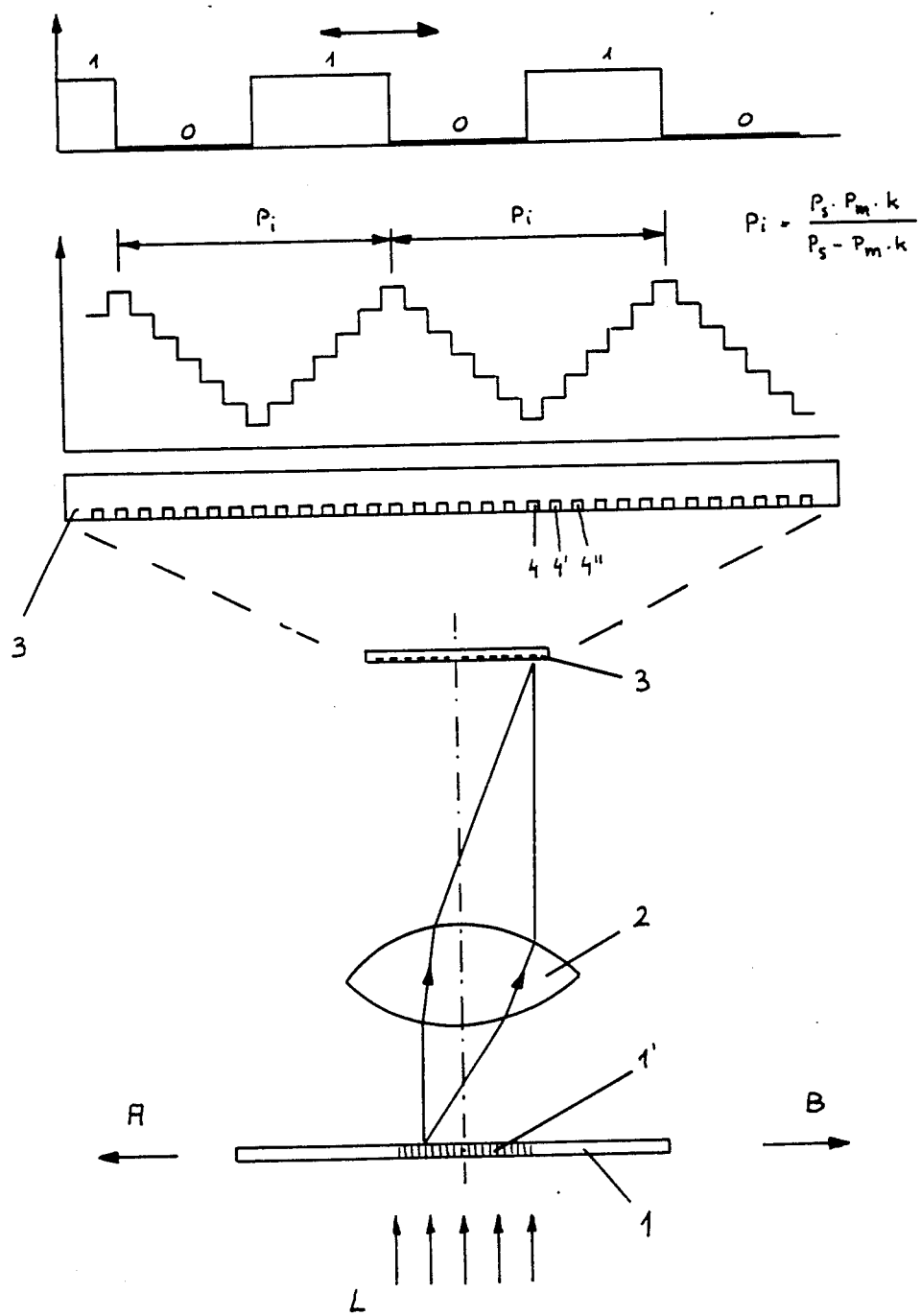
FIG. 1 illustrates a basic schema of determination of positions by means of optical interference.

In order to basically explain the function the description shall proceed from a transparent scale of glass having a regular light/dark-line grid of the period Pm (e.g. Pm=20 $\mu$m, i.e. every 10 $\mu$m transparent alternating with 10 $\mu$m masked). FIG. 1 of the drawings illustrates how by means of a non-coherent light source L the optical picture of the scale 1 having a regular line grid 1' with the period Pm (e.g. 20 $\mu$m) is projected via an optical means, e.g. a lens 2 onto a photosensitive element 3 which in the illustrated example is a silicon-chip having a length of for instance 7 millimeters.

The photosensitive element 3 consists of a linear array of photodiodes 4,4',4", etc. which are mounted onto a silicon chip equidistantly spaced, i.e. in equal distances Ps (e.g. Ps=24 $\mu$m, of which every 12 $\mu$m are a sensitive area and every 12 $\mu$m are insensitive).

The optical magnification factor k (e.g. k=1.15) is chosen such that the spacing of the photodiodes Ps differs from the spacing of the projected light/dark areas by a predetermined value.

In this case the intensities of the light which is received by the individual diodes 4 increase and decrease linearly and generate an interference pattern having the period Pi:

$$Pi = (Ps \cdot Pm \cdot k)/(Ps - Pm \cdot k) \tag{1}$$

In case of the stated exemplary figures, namely:

Pm=20 $\mu$m, Ps=24 $\mu$m, k=1.15 an interference pattern having the period Pi=552 $\mu$m would result.

If the scale is moved in one of the directions indicated by the arrows A or B relative to the stationary system encompassing light source L, optical means 2 and sensor-element 3 by the length of dl, the interference pattern on the chip 3 will shift by dL:

$$dL = dl \cdot Ps/(Ps/k - Pm) \tag{2}$$

Using the examplary figures, namely: Pm=20 $\mu$m, Ps=24 $\mu$m, k=1.15, dl=1 $\mu$m/k this yields dL=24 $\mu$m.

Photodiode-arrays of this kind and having an analogue signal output are generally available (CCD=Charge Coupled Devices). The fact, however, that in the application described herein the intensity of light increases or decreases from diode to diode by a practically constant value allows a relatively simple signal evaluation which can be co-integrated directly adjacent the photodiodes 4. The evaluation is limited to merely detecting which of two directly adjacent diodes has been more intensively illuminated. The values of the intensities can be directly digitalized binarily by generating a logical 0 if the left hand diode is illuminated more intense than the adjacent right hand diode, and in the opposite case a logic 1. A sequence of logical conditions 0 and 1 generated by such procedure produces a square wave function having a phase sequence which is identical to such of the above described interference pattern. This is also derivable from the schema according to FIG. 1.

In the here used examplary figures such means that upon a shifting of the scale by somewhat less than 1 $\mu$m the binary sequence is shifted by one bit (corresponding to 24 $\mu$m). In the subsequent software based evaluation of these digital informations the relative position can in the concrete case be determined with an exactness of 0.2 $\mu$m by a careful correlation with a reference sequence.

Figure 2A:
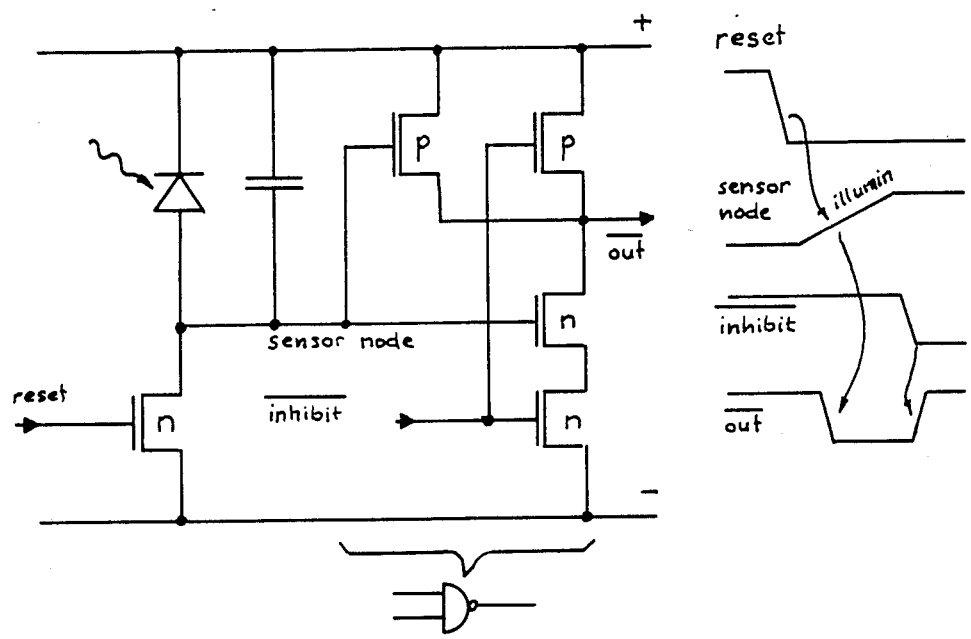
FIG. 2a illustrates one possible circuit diagram of a single photodiode.

FIG. 2a of the drawings illustrates the relatively simple expenditure regarding the circuit which must be arranged for every single diode in order to allow the execution of the described processing procedure. The illustrated circuit is designed for the CMOS-technology, but other technologies (e.g. NMOS) can be used too. The transistors which form basically a NAND-gate having two inputs are placed on the chip in the immediate neighbourhood of the photodiode. This leads to extremely short connections (a few $\mu$m) for the critical analogue signals from the photodiode for the evaluation and digitalization. The CMOS- (as well as the NMOS-) technology allows an arranging of the necessary circuit elements on a tiny area having a width corresponding to the spacing between the photodiodes.

At the beginning of the measuring procedure the anode connection of the photodiode is connected temporarily to the minus-line by means of a "reset"-signal and via a transistor. During the measuring step the reverse-polarized diode, which represents a capacitance, will discharge by the leakage current which is influenced by the illumination and additionally switch at a predetermined instance the output voltage "out" from the originally positive value (logic 1) to Zero (logic 0). This process can be interrupted prematurely if the second gate input "inhibit" switches from originally logic 1 to logic 0 which follows in that the output signal returns to logic 1.

Figure 2B:
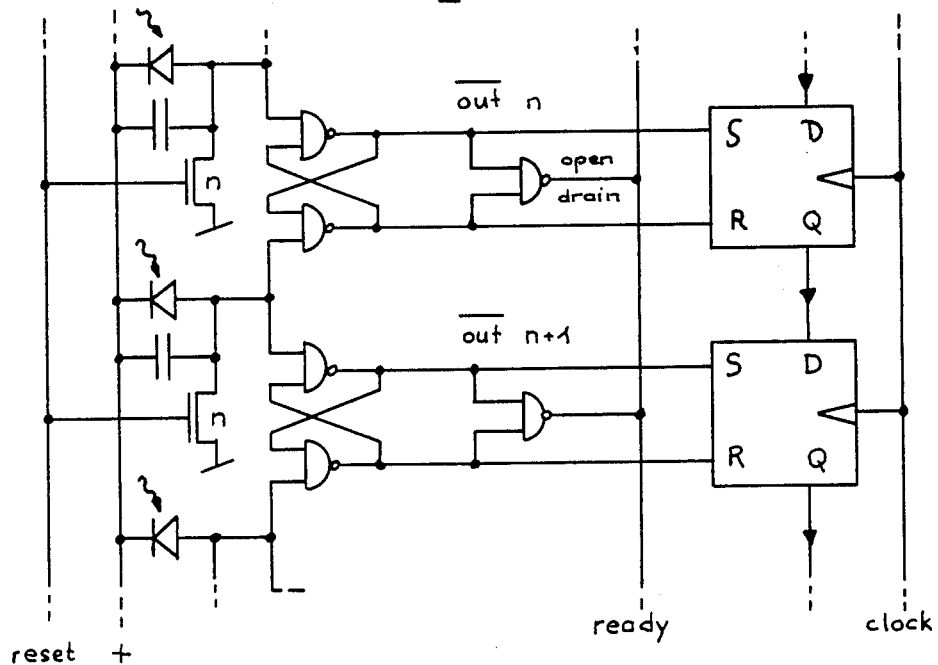
FIG. 2b illustrates the basic arrangement of a linear photodiode array having an integrated digital signal evaluation.

FIG. 2b illustrates how the elements are coupled together to form an array. The NAND-gates are coupled crosswise which leads to a "Flip-Flop"-circuit which decides binarily which of the two diodes connected thereto is illuminated more intensely. The common "ready"-line ("wired-or"-connection) indicates when the decision is terminated over the entire array and the binary information can be read out over a shift register (D-flip-flops).

By means of the arrangement described until now it is possible to follow the shifting of the optical scale incrementally by following the phase sequence. In order to allow an absolute measuring of positions the line grid of the scale can be coded additionally. To this end the hitherto regular light/dark pattern is inverted locationwise corresponding to a binary pseudo-random sequence, i.e. light and dark areas are interchanged.

The pseudo-random sequence is one that is apparently of a random sequence of 0's and 1's of the length $2^n-1$ bits, is, however, generated deterministically. An important feature of such a binary sequence is the fact that based on the knowledge of n consecutive bits the exact position of this part-sequence of a length of n-bits can be determined within the entire sequence of $2^n-1$ bits.

In a concrete numerical example this leads to following:

| | |
|---|---|
| line grid-period | $P_m = 20\ \mu m$ |
| length of bits of the coding sequence | $L_b = 18 \cdot P_m = 360\ \mu m$ |
| spacing of photodiodes | $P_s = 24\ \mu m$ |
| number of photodiodes in the array | $m = 256$ |
| optical magnification factor | $k = 1.15$ |
| conclusion thereof: | |
| length of array (= length of chip) | $L_a = m \cdot P_s = 6144\ \mu m$ |
| chip | $L_p = L_b \cdot k = 414\ \mu m$ |
| number of projected bits on chip | $N_p = L_a/L_p = 14.84$ |
| number of definitely readable bits projected on to chip | $n < N_b - 1 = 13$ |
| maximal length of scale | $L_m = (2^n - 1) \cdot L_b = 2.95\ m$ |

The numerical example describes a realizable configuration. It can be seen therefrom that by means of a relatively small sensor-chip (length about 7 millimeters) an absolute detection of a position having a resolution of less than 1 $\mu$m is possible over a length of several meters. The range of measurement is restricted mainly by the realizable length of the line-grid scale.

Figure 3:
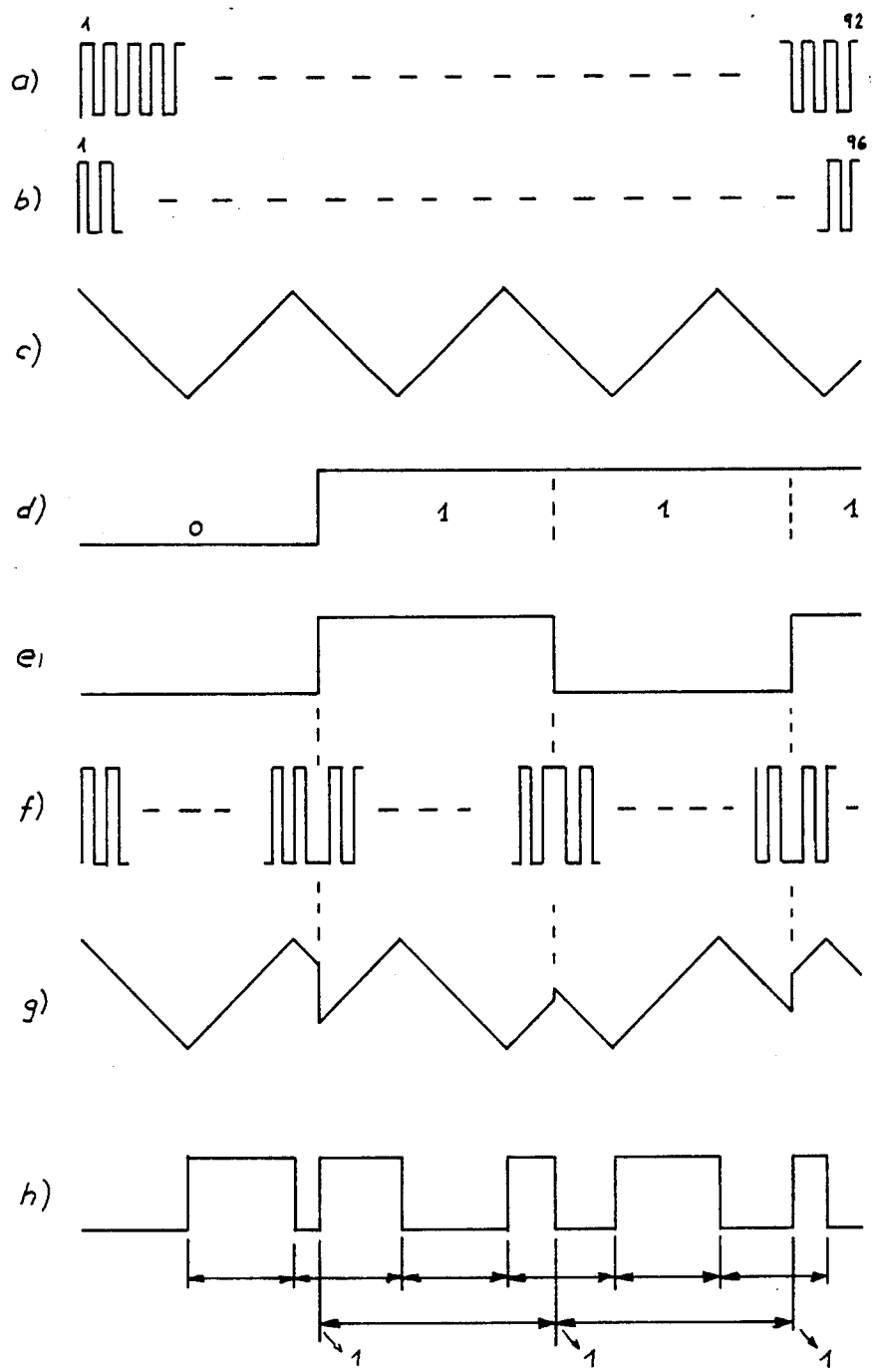
FIG. 3 illustrates a basic schema of the coding of an optical grid for an absolute value measurement, including coded output signals.

The principle of the coding of the optical grid is illustrated in FIG. 3. For sake of clarity numerical ratios are used which differ from those of the proceeding numerical example. The curves a and b illustrate in the shape of a binary function the positions of the photodiodes or the light/dark-pattern of the line scale projected thereupon. Curve c illustrates the resulting interference pattern, i.e. the (continuously drawn) intensity of light striking the diodes. The coding of the line pattern is illustrated by the curves d, e and f. Curve d illustrates a section of the binary pseudo-random sequence which is picked up by the array of diodes. The binary-sequence is recoded such ("transient" coding, curve e) that the light/dark-pattern on the line grid is inverted at every logic 1, i.e. that the light/dark positions are exchanged (curve f). This results in a respective phase reversal of 180° in the interference pattern (curve g).

This coding does not change anything regarding the fact that the intensity curve increases or decreases always at a constant slope. The binary digitalisation of the distribution of the intensity by comparing the currents of adjacent diodes generates a binary sequence (curve h) which reproduces the phase position of the interference pattern as well as the changing of the phase generated by the coding.

The further processing of this binary sequence proceeds suitably by software means and will not be explained further herein.

Its phase position can be determined by correlating with a reference-interference pattern (fine resolution). In that way the coded binary sequence will be perceptible, too. Its phase position as well as the recognized sequence of bits allow a simple exact determining of the absolute position on the line scale (taking the optical magnification factor k into consideration) down to a diode spacing $P_s$ (absolute rough measurement). Together with the result of the fine resolution it will now be possible to calculate the exact position.

In summarizing it shall be repeated that it is possible, proceeding from an optical line-grid scale the production of which in the necessary precision is technically mastered, to produce an universally employable apparatus for measuring an absolute position with an exactness of less than 1 $\mu$m over measured lengths of several meters with the aid of a few additional elements, namely a light source (e.g. non-coherent), possibly a lens (e.g. a cylindric lens, because it must focus only in the direction of the array) and an integrated sensor element (produceable in accordance with generally known NMOS- or CMOS-technology).

The concept of the circuit on the sensor chip is basically digital and accordingly practically uncritical and immune regarding disturbances. The output signal can be fed directly to a processor. In addition it is conceivable to implement a part of the digital subsequent processing directly on the chip.

In comparison with the present incremental-measuring gauges the described absolute-value measuring incorporates the advantage that upon a switching-on of the apparatus or after an interruption of the power supply the correct position value is supplied immediately, i.e. a controlling and checking of special markings is not necessary.

Figure 4A:
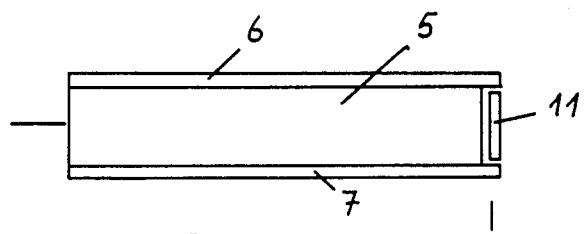
FIG. 4a and 4b illustrate an only schematic view from above and from the side, of an apparatus for an optical measuring of positions (without processor).
Figure 4B:
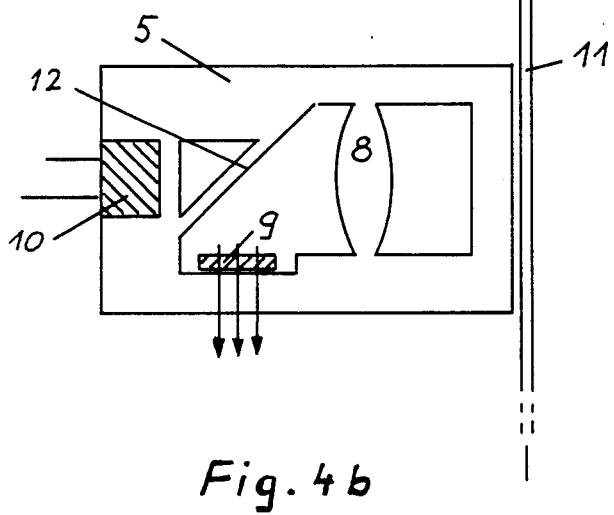

A practical design of such a measurement transmitter which can be produced easy is illustrated in FIG. 4a and 4b. The arrangement consists of a transparent plastic or glass body 5 having lateral covers 6 and 7, which body 5 forms at the same time the focusing-optics (cylindric lens) and serves as support of a sensor element 9 (chip) and of the light source 10 (e.g. LED). In the side view of FIG. 4b the covers are omitted In this embodiment the line grid scale 11 is reflected and arranged displaceable along the face side of the body 5. The light reaches through the transparent mirror 12 and via the optics 8 the line-grid scale, is reflected, focused and projected via the mirror 12 onto the sensor chip 9. This chip 9 is connected to a not illustrated processor.

While there are shown and described present preferred embodiments of the invention, it is to be distinctly understood that the invention is not limited thereto, but may be otherwise variously embodied and practiced within the scope of the following claims.

I claim:

1. A method of optically measuring the position between two elements, comprising:

forming a line grid of a photosensitive element having a plurality of photodiodes equidistantly spaced from each other and a corresponding plurality of digital switching elements each operative to generate signals from a respective one of said plurality of photodiodes, said photodiodes and digital switching elements being integrated on a common substrate;

displacing an optical scale having a predetermined line grid relative to said photosensitive element line grid to form a distance to be measured; and projecting said optical scale onto said plurality of photodiodes such that the projected density of the lines of said scale differs from the line grid of said photosensitive element to generate an interference pattern representative of the distance between the two line grids.

2. The method of claim 1, further comprising coding the line grid of said optical scale to provide an absolute measurement of the distance between the two line grids.

3. The method of claim 2, wherein the coding of the optical line grid includes the generation of binary signals representative of said interference pattern and is obtained by a sectional interchanging of light and dark areas according to a predetermined pattern with an interchanging for the binary value "1" and no interchanging for the binary value "0".

4. The method of claim 2, wherein the coding of the optical line grid includes the generation of binary signals representative of said interference pattern and is obtained by interchanging for the binary value "0" over a shorter interval and an interchanging over a longer interval for the binary value "1".

5. Optical measuring apparatus for measuring the distance between two elements, comprising a light source, a photosensitive element in the form of a plurality of equidistantly spaced photodiodes forming a line grid, and an optical scale adapted to be movable relative to said photodiodes to establish the distance to be measured, the line grid of said scale being projectable onto said photodiodes by means of said light source, said photosensitive element including digital switching elements allocated to each one of said photodiodes, which switching elements are integrated on the same substrate as said photodiodes.

6. The apparatus of claim 5, further comprising an optical means for projecting said line grid of said scale onto said photosensitive element.

7. The apparatus of claim 6, which said light source and said photosensitive element are located in a transparent glass or plastic body forming the optical means for the projection of the line grid of the scale onto said photosensitive element.

* * * * *